Nov. 9, 1965 C. ABERT 3,217,109

DISTRIBUTED TELEPHONE SWITCHING SYSTEM

Filed Dec. 26, 1961 5 Sheets-Sheet 1

INVENTOR
C. ABERT
BY
S E Hollander
ATTORNEY

INVENTOR
C. ABERT
BY
SE Hollander
ATTORNEY

Nov. 9, 1965 C. ABERT 3,217,109

DISTRIBUTED TELEPHONE SWITCHING SYSTEM

Filed Dec. 26, 1961 5 Sheets-Sheet 3

INVENTOR
C. ABERT
BY
S E Hollander
ATTORNEY

INVENTOR
C. ABERT
BY
S E Hollander
ATTORNEY

Nov. 9, 1965 C. ABERT 3,217,109

DISTRIBUTED TELEPHONE SWITCHING SYSTEM

Filed Dec. 26, 1961 5 Sheets-Sheet 5

INVENTOR
C. ABERT
BY
S E Hollander
ATTORNEY

United States Patent Office 3,217,109
Patented Nov. 9, 1965

3,217,109

DISTRIBUTED TELEPHONE SWITCHING SYSTEM

Charles Abert, Mantoloking, N.J., assignor to Bell Telephone Laboratories, Incorporated, New York, N.Y., a corporation of New York Filed Dec. 26, 1961, Ser. No. 162,163
15 Claims. (Cl. 179—18)

This invention relates to automatic telephone switching systems and more particularly to telephone switching systems in which elements of the conventional equipment normally disposed at the central office are detached therefrom and removed to a remote location.

A matter of continuing concern to telephone switching engineers has been the problem of supplying service to groups of subscribers who are remotely located from a telephone central office. The problem in this regard is twofold: In the first instance the subscribers may be located at a distance from the central office which is so great as to preclude the economic feasibility of extending an individual line from each of the subscriber substations to the telephone central office; and second, the number of subscribers at the remote location, although perhaps substantial, is not sufficient to justify on an economic basis the installation of a telephone central office unit in the vicinity of the subscribers.

In the past, this problem has been attacked, in part, by the use of telephone line concentrator units. The latter devices are arranged to literally "concentrate" a larger number of subscriber lines at a centralized remote location and to extend these lines over a lesser number of trunks to the telephone central office—the obvious economy being the copper savings through the reduced cable facilities required for the trunks.

In large measure, concentrator units were predicated on the desirability of providing universal concentrator facilities. The term "universal" is applied to a concentrator which is equipped to operate with any conventional telephone switching office without the necessity of modifying either the office or the concentrator itself. Universal concentrators are particularly advantageous in view of the desirability of avoiding any invasion of the central office equipment per se. In short, the measure of effectiveness of a universal line concentrator is the degree to which the central office is between the concentrated lines and those which are, in fact, directly connected to the central office.

It is apparent, therefore, that the prior art philosophy for servicing remote groups of subscribers was predicated on the engrafting of integrated concentrator units on already complete switching systems.

This type of universal concentrator operation which permits servicing a group of remote subscribers without a substantial invasion of the central office equipment is desirable as a short-term expedient. The reason for denominating this type of service merely expedient will be apparent when a typical situation is examined.

It will be assumed that a housing development is erected on the periphery of an existing suburban community but sufficiently removed from the telephone central office to make desirable the use of concentrator equipment. Historically, similar development-type communities have radiated from the central suburban community in all directions. Examining the situation piecemeal would tend to foster the development of separate concentrator units for each of the communities. After a sufficient period of time, the concentration of subscribers in some of the previous "remote" communities approaches in size those in the original community or at least a size sufficient to warrant the installation of modern telephone central office equipment.

Under these circumstances the prior installation of a relatively substantial number of telephone concentrator units has been demonstrated to be economically injudicious since they must all now be supplanted by a conventional telephone central office.

It is therefore an object of this invention to provide a "distributed" telephone switching system in which a conventional portion of the switching equipment is removed from the central office to serve a group of remote subscribers.

In accordance with this invention and using the No. 5 crossbar telephone system as an illustrative vehicle for explaining the operation thereof, a conventional line link frame is removed from its usual location in the telephone central office and disposed in the field at a location which may be, for example, 15 miles distant from an existing central office. To this remote line link frame are connected the remote community subscribers in the same manner in which they would have been connected to the conventional line link frame if they were indeed directly connected to the office. Having considered the fact that the remote line link frame is intentionally a conventional unit and the lines are connected to the frame in precisely the same manner that they would have been if the frame were in the existing central office, the use of the remote line link frame as a nucleus or foundation block around which to build the remainder of the central office—should future growth dictate this need—is manifest.

In short, as the number of subscribers in the remote community continues to increase and at the time that the installation of a central office to serve these subscribers is determined to be economically feasible, the remaining switching and common control equipment may be disposed at the same location and connected to the already intact remote line link frame, thereby completely eliminating the temporary or short-term expedient type of solution found in line concentrator usage and the economic wastefulness which results when the concentrators must be abandoned in favor of a direct connection to the office.

It is apparent that the instant arrangement, which is predicated on the introduction into the field of a conventional line link frame compatible with the remainder of the No. 5 crossbar telephone equipment later to be installed, permits the efficient servicing of new population centers during each stage of their growth. In fact, the new central office thus created by augmenting the previous switching equipment in the field with common control equipment can now in its turn serve as a parent office from which additional remote switching units may depend. In this manner the growth process is orderly and continuous and closely parallels the rate of suburbanization.

The remote disposition of the line link frame to which the subscriber lines are connected does, of course, include the advantages adduced above. However, as with all other telephone switching proposals which involve conceptual departures from the prior art, new problems are generated. In particular it must be recognized that since the remotely disposed equipment is, by definition, in an area suburban to that in which the central office is located, somewhat different traffic patterns may be expected. In short, it has been found that the intracommunal calling rate, e.g., as between neighbors, is substantially higher than has been found to be the case in a highly urbanized metropolitan area.

For this reason, intra-unit calls may represent a significant burden on the remote switching equipment. This difficulty may be shown to be a peculiarly aggravated one since the switching pattern in an intra-unit call would be as follows. The calling substation is extended over a conventional line loop to its termination in the remote line link frame. From the line link frame the call is further connected over an "extended junctor" (which will be explained in detail herein), the length of which may perhaps be fifteen to twenty-five miles to a trunk link frame at the central office. Thereafter the call would extend through the conventional intraoffice trunk and an outgoing trunk link frame connectable to the same remote switching unit. Again the terminating portion of the call would be forwarded over an extended junctor circuit of the same length to the appropriate line link frame in the remote unit. Thus, the single calling connection may occupy as much as fifty miles of common switching channels together with substantial (and expensive holding-time) common equipment at the remote unit and central office. The inefficiency of such an arrangement is presented in sharpest relief when it is appreciated that the calling and called parties may be next-door neighbors.

It is therefore an object of this invention to provide for the servicing of intra-unit calls wholly at the remote unit.

An additional object of this invention is to preclude the necessity of extending multiple speech paths to the central office in the event of an intra-unit call.

As indicated hereinabove, one of the essential criteria in establishing the distributed switching system was that the equipment at the central office remain as free from modification as possible. This produces a difficulty with respect to intra-unit calls since the marker circuitry must at least be provided with sufficient additional intelligence to determine that the connection is, in fact, to be made between substations connected to the same remote unit.

It is therefore an object of this invention to provide routing intelligence in the marker circuitry which will identify the existence of an intra-unit call.

An additional object of this invention is to provide routing intelligence in the marker circuitry which will identify a call between a remote unit and the central office.

A further object of this invention is to provide routing intelligence in the marker circuitry which will identify the existence of a call from a remote unit substation to a distant office.

These and other objects and features of the invention may be achieved in an illustrative embodiment in which a number of conventional No. 5 crossbar line link frames are disposed in an area contiguous to the subscribers to be connected thereto. The particular location selected may be perhaps twenty-five miles from the No. 5 crossbar "master" office itself. Each of the lines to be served by the remote unit is terminated at the No. 5 crossbar line link frame in the conventional manner on the vertical conductive paths as described in detail in Patent 2,585,904 of February 19, 1952, to A. J. Busch. In addition, a trunk link frame which will illustratively include intra-unit trunks to provide intraremote unit switching connection paths is also included at the remote location. These trunk link frames are also of the type described in the above-referred-to patent. The over-all arrangement of the line link frames and the trunk link frames at the remote unit is such that with respect to the central office the remote unit is equipped as though the various control connections emanating from the line link and trunk link frames extended directly to the central office (although they do not). This arrangement is intentional in order to provide for the future disposition of common equipment at the remote unit when economically justifiable without the necessity of major structural innovations at the remote unit.

The connections between the remote unit and the master No. 5 crossbar office are of two general categories. In the first group are included the control connections ordinarily extending between the link frames, trunk link frames, and the common equipment in the office. The second group includes the extension of the speech paths or junctors between the remote unit and the central office.

Since it would be uneconomical to provide a line for line connection for all of the control conductors over the relatively lengthy distance to the office, the control communication is by way of a data transmission system which may be of any suitable type, for example that shown in an application of J. Z. Jacoby, Serial No. 139,174, filed September 19, 1961.

The speech paths or second group are coupled to the office over literally "extended" junctor circuits which include the necessary conventional repeater amplifiers to transmit speech and other information from the remote unit to the central office.

Each substation connected to the remote line link frame is serviced by common control equipment at the No. 5 crossbar office over the data transmission system. Transmission connections are made over the extended junctor circuits. The general operation of the system with the exceptions indicated, parallels in large measure (and intentionally) the conventional operation of the No. 5 crossbar system explained in detail in the above-referred-to Busch patent.

Thus, in servicing an originating call at a line connected to a remote switching unit, the off-hook condition results in the operation of the conventional line relay in the remote line link frame which in turn apprises a line link marker connector in the central office over the data transmission system that a marker is required. The line link marker connector seizes an idle marker over the data transmission system and transmits to the marker the identity of the calling line.

The marker then proceeds in a conventional manner to establish a dialing connection between the subscriber line and an idle originating register. In doing so the marker ascertains the calling line link frame number and the equipment number of the calling line on the frame. In addition, the marker determines the availability of an idle register and the number of the trunk link frame on which the idle register appears. In addition, the marker establishes that an idle channel (including an extended junctor) between the remote line and the register is available. The calling line class of service and equipment location is stored in the originating register by the marker.

The marker then proceeds to select an idle channel between the subscriber line and the originating register. In the present embodiment, the channel consists of a line link, an extended junctor and a trunk link. After the availability of the channel is established, the marker operates the appropriate select and hold magnets in the central office and in the remote unit to close through the channel. The register supplies dial tone to the substation and is prepared to receive the digits which are dialed.

The subscriber may now proceed to dial the called directory number. For purposes of illustration it will be assumed that the called directory number represents a number of a substation connected to the same remote unit as the calling subscriber.

After registration of the called directory number in the originating register, the information therein contained is delivered to a selected marker. Conventional equipment in the marker is then utilized to examine the first three or office code digits to determine the routing of the call. The result of this translating procedure is to place a marking potential on a particular code point in an array of code points, each representative of different routing treatments. It is in this area that additional memory has been incorporated in the marker circuit to identify an intra-unit call. The specific procedures utilized will be explained in detail herein. Since it has been assumed that an intra-unit call is in effect, the marker proceeds to establish a connection over the intra-unit trunk located in the remote unit. In doing so, it operates the appropriate select magnets and hold magnets to establish a terminating connection between the called line and the "B" appearance of the intra-unit trunk, and subsequently the originating connection is set up between the calling line and the "A" appearance of the intra-unit trunk.

As in the case of intraoffice calls, the terminating connection is established after the marker has obtained the equipment location of a called number from the number group circuit and the appropriate ringing to be employed.

In establishing the originating connection between the calling line and the "A" appearance of the trunk, the marker seizes the line link frame of the calling substation over the data control system.

After the marker energizes the ringing selection switch in the appropriate manner, it releases itself and the originating register. The subscribers are now interconnected over the intra-unit trunk. Ringing is tripped when the called party answers. When the conversation is completed, the on-hook condition of the substations is detected by the intra-unit trunk and the originating and terminating connections are released in a conventional manner but autonomously at the remote unit rather than under control of the office.

It has been implicit throughout the above description that although the remote line link frame and trunk link frame are isolated at a considerable distance from the central office, control signals therebetween must be transmitted as though direct electrical connections obtained between both ends. It is the function of the data transmission equipment or signaling system therefore to bridge the gap between the remote switching unit and the central office in a manner which makes it appear to the central office that the line link frame is directly connected thereto rather than divorced therefrom by a data transmission system.

Thus, for example, a ground condition on a vertical group conductor at the remote line link frame is converted by the data transmission system to an appropriate signal for transmission to the central office whereat the data is reconverted to an indication on the same conductor to which the vertical group conductor would have been connected conventionally at the central office.

Also, as indicated above, in conventional practice the line link frame in the central office is connected over junctor circuits to various trunk link frames. The latter extend to originating registers, incoming trunks, outgoing trunks, etc. Arrangements are made as disclosed herein in detail for extending or "stretching" these junctor circuits between the line link frame at the remote unit and the central office by introducing appropriate repeating amplifiers therebetween. Here again the purpose is to simulate a direct connection between the line link frame at the remote unit and the central office.

The above and other objects and features of the invention may be more readily comprehended from an examination of the following specification, appended claims, and attached drawing in which:

Figures 2, 6:
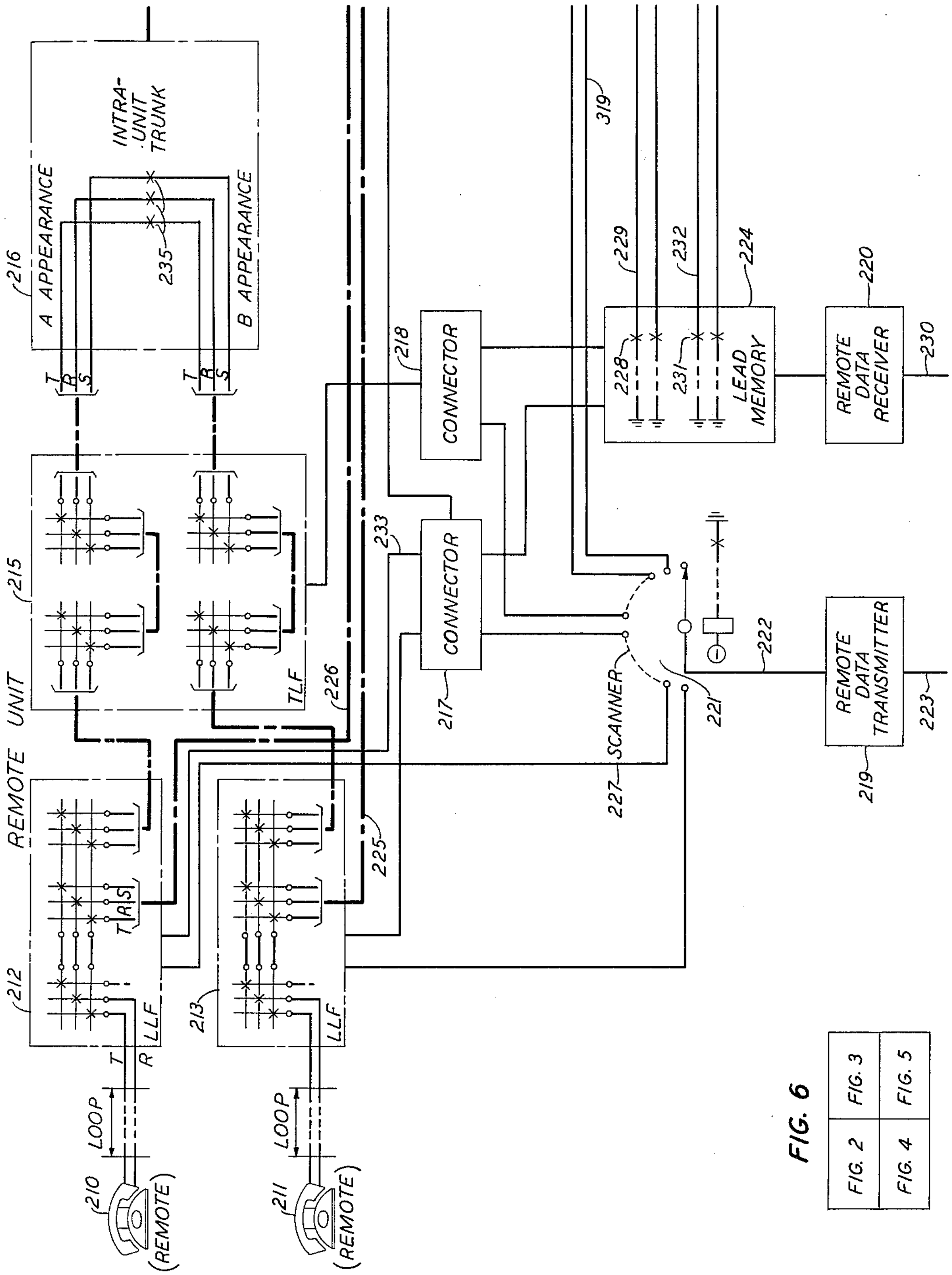
FIGS. 2 and 3 show the remote unit equipment including the line link and trunk link frames and the extended junctor circuitry.
Figure 3:
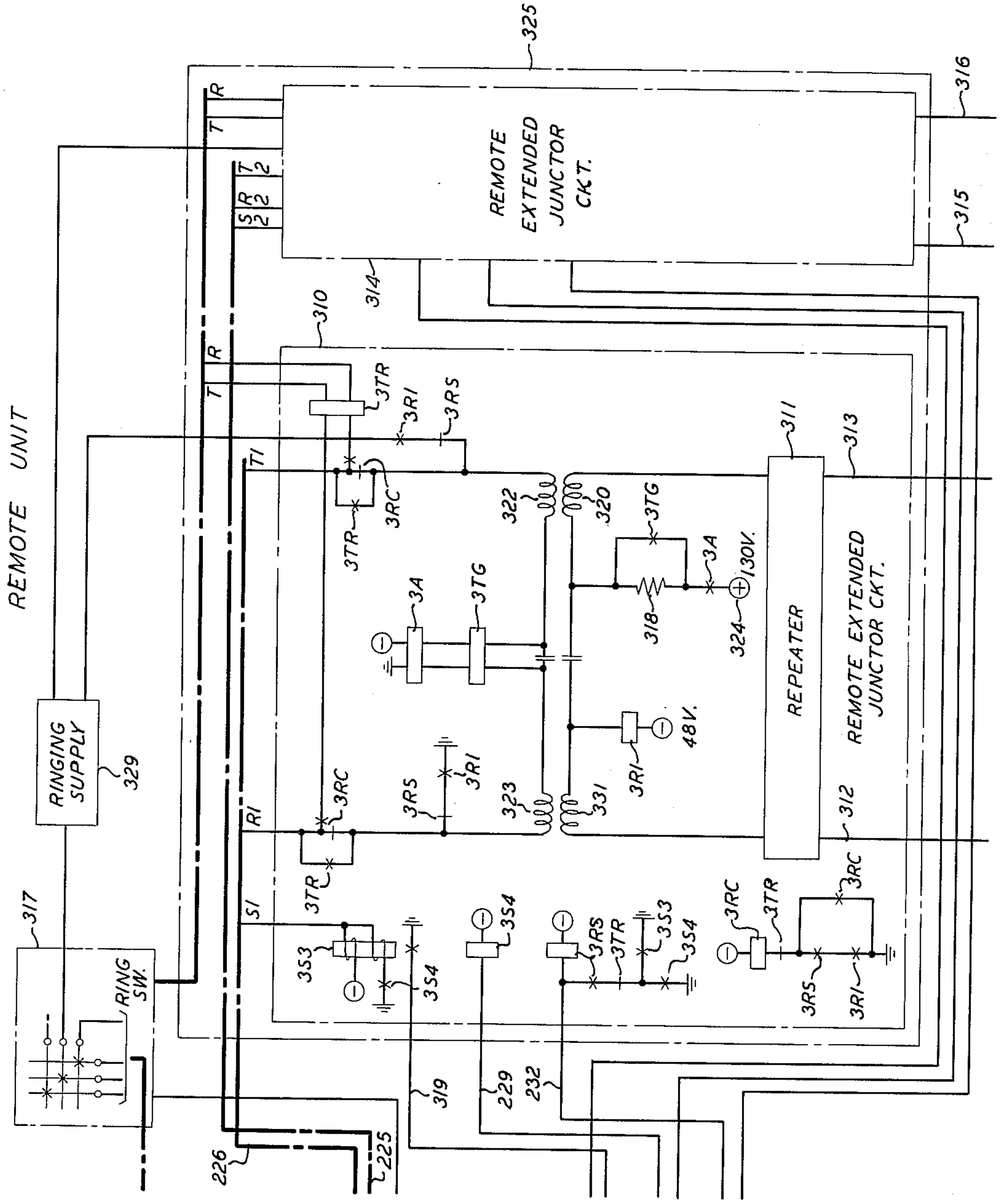
Figure 4:
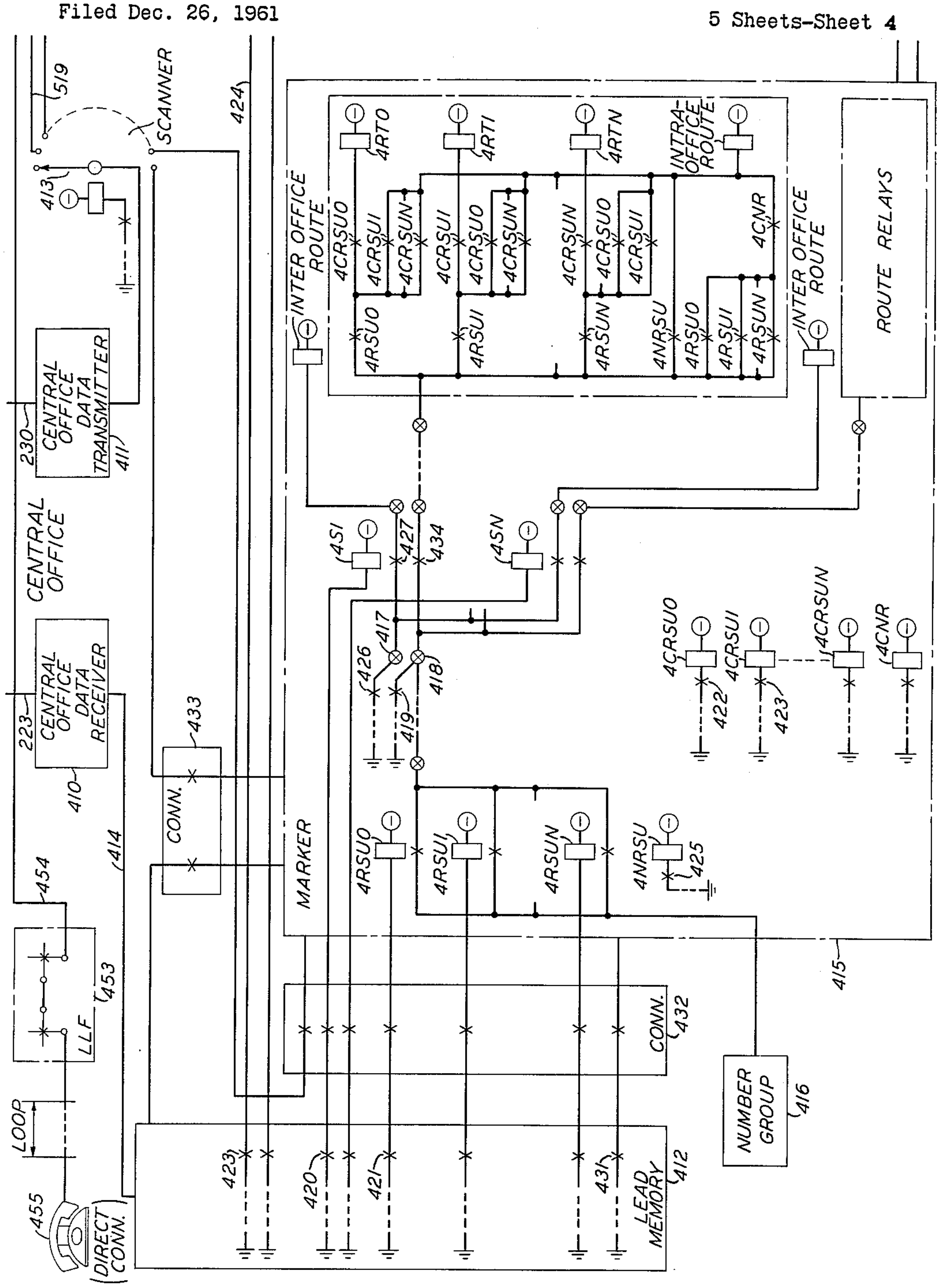
FIG. 4 shows the required modifications in the marker circuitry for intra-unit routing of calls.
Figure 5:
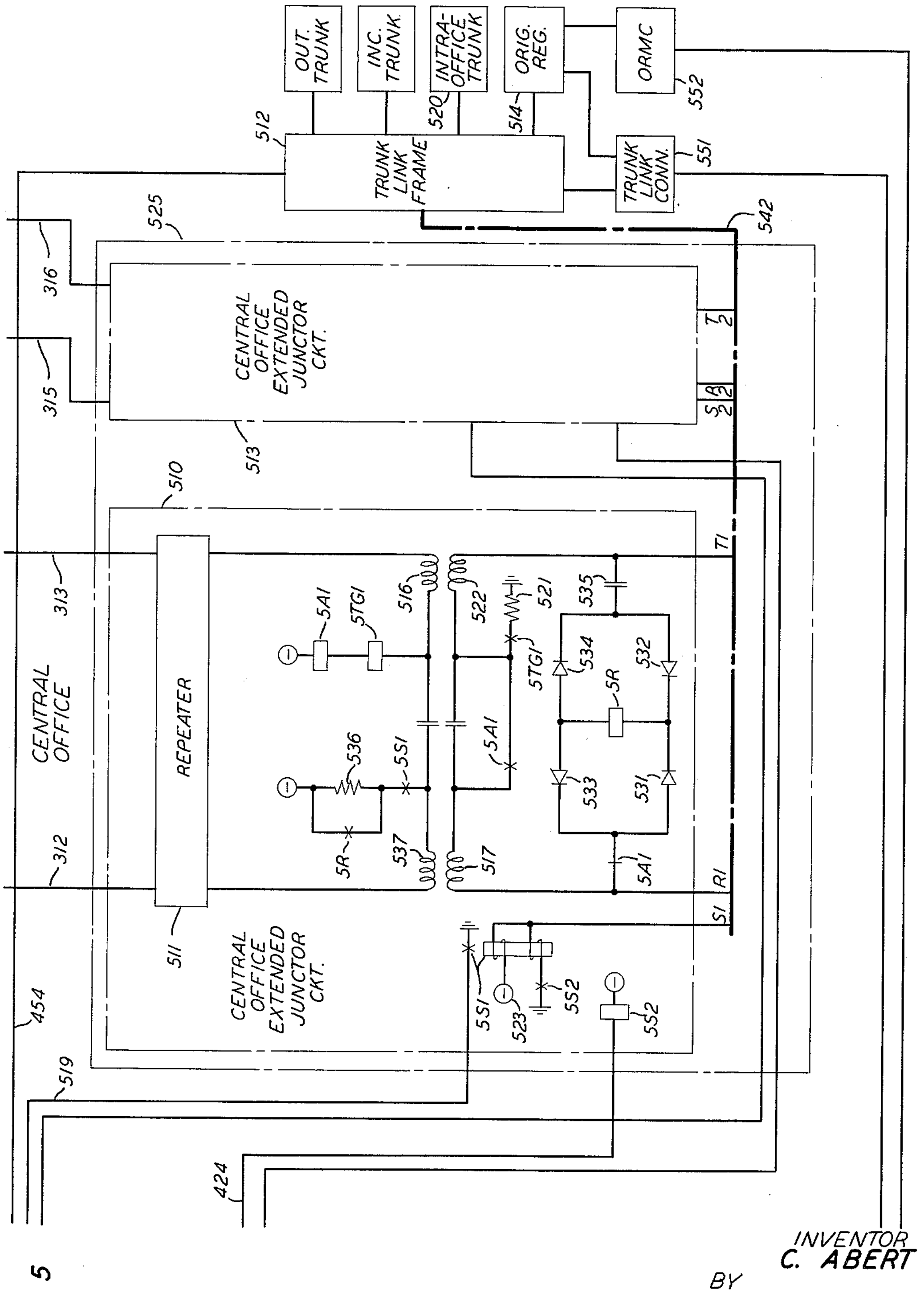

FIG. 5 includes the central office portion of the extended junctor circuitry; and FIG. 6 depicts the arrangement of FIGS. 2 to 5.

GENERAL DESCRIPTION

Figure 1:
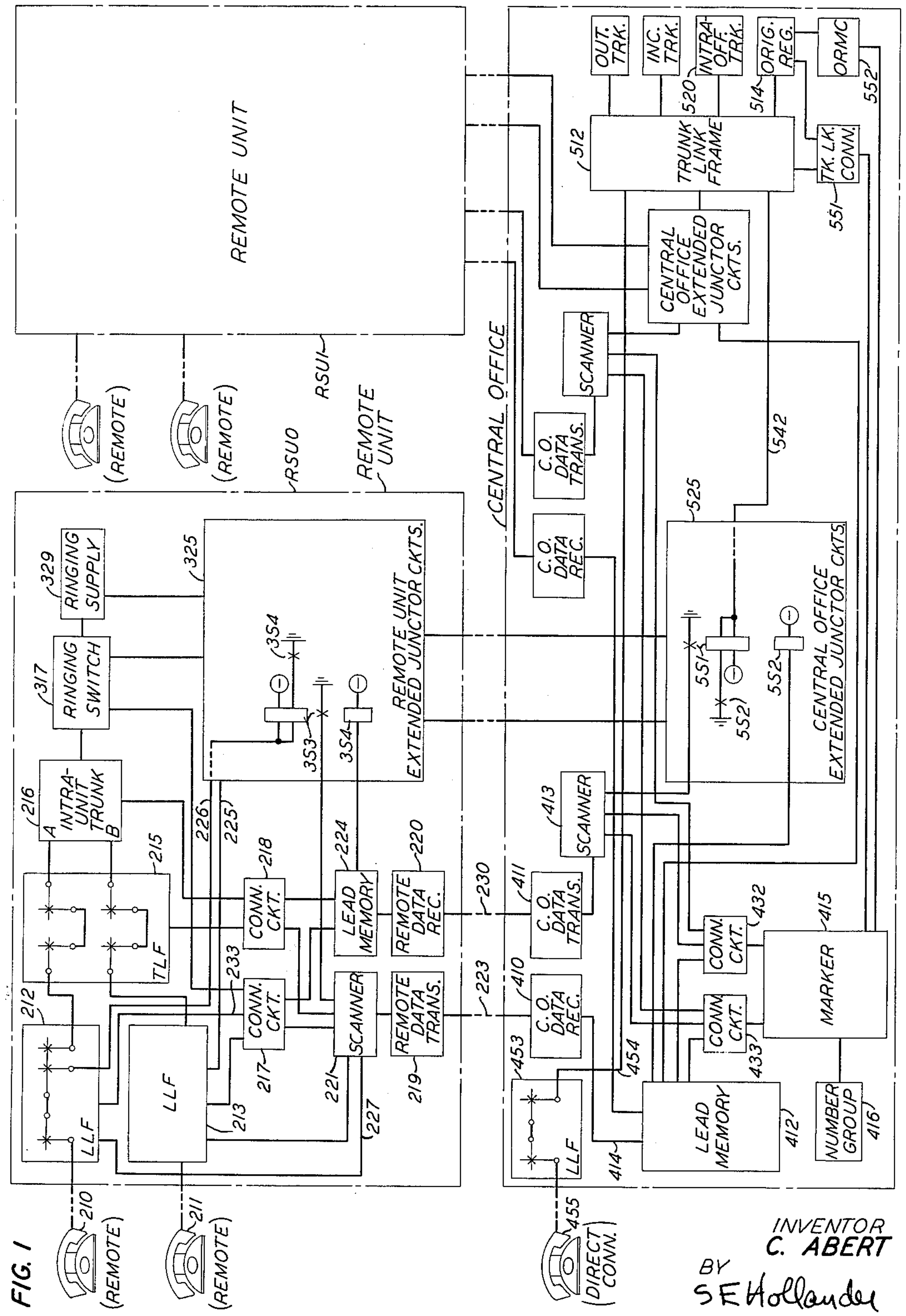
FIG. 1 shows an outline diagram of one specific illustrative embodiment of the invention in combination with a No. 5 crossbar telephone switching system.

FIG. 1 shows in general outline the remote units RSU0 and RSU1 of which only unit RSU0 is shown comprehensively. Where appropriate, the equipments shown in outline form in the remote unit RSU0 and the central office bear the same reference designations which appear in the detailed FIGS. 2–5. It will be noted that only those elements essential to an understanding of the present invention are shown. Reference may be made to the above-referred-to Busch patent for a detailed description of the No. 5 crossbar system.

For illustrative purposes it will be assumed that remote substation 210 is initiating an intra-unit call to remote substation 211. When substation 210 goes off hook, an indication thereof is transmitted from line link frame 212 to a terminal on scanner 221. In its periodic examination of all of the conductors connected thereto, scanner 221 detects the energized condition of line link frame 212 over conductor 227 and delivers an indication thereof to remote data transmitter 219 which in turn is coupled to receiver 410 at the central office. The information thus received at a relatively high rate of speed, as explained herein, is stored in a buffer circuit or lead memory 412 which stores the information on a semipermanent basis and in turn energizes conductors in the central office which correspond to the identical conductors which would have been energized if line link frame 212 were, in fact, situated in the office and directly connectable to the common equipment.

In a conventional manner, a marker 415 is selected and information representative of the calling number is delivered thereto. The marker, after trading information with the unit, prepares to establish a connection from the calling line to an originating register, for example register 514. The necessary information is transmitted from the marker and over the data transmission system via scanner 413 to the remote unit to establish the channel between calling substation 210 and originating register 514. Ultimately, when the appropriate horizontal and vertical magnets in the crossbar switches are operated, a circuit will extend from substation 210 through line link frame 212 over conductor 226 to the remote portion of the extended junctor circuit 325. The circuit may be further traced over the extended junctor to the central office portion of the extended junctor circuit 525 and thereafter to trunk link frame 512 and originating register 514 over cable 542. In this manner the subscriber is connected to the originating register which furnishes dial tone in the conventional manner and is prepared to receive the dialed digits.

It will be noted that connectors 217, 218, 432, 433, 551 and 552 are instrumental during control operations in providing access by the marker to other circuitry as explained in detail herein and in the Busch patent.

In view of the assumption that substation 211 is the called substation, originating register 514 will receive and store seven digits corresponding to the directory number of called substation 211. After the necessary information is stored, originating register 514 engages marker circuit 415 in the conventional manner over originating register marker connector 552 and transmits the required information to the marker.

Marker 415 now proceeds to effect a connection between the calling and called substations.

At the outset, the marker examines the first three or office code digits to determine the routing of the call as explained in detail herein. Since, as illustrated in FIG. 1, calling substation 210 and called substation 211 are connected to the same remote unit RSU0 an intra-unit call is in effect. Additional equipment in the marker shown in detail in FIG. 4 is utilized to determine that the call is, in fact, an intra-unit call. Ultimately a route relay in the marker representative of an intra-unit call is energized and governs the particular channel to be employed in completing the connection. In the present illustration, the marker will proceed to establish an intra-unit trunk connection by selecting an intra-unit trunk in the remote unit of which trunk 216 is representative. Thereafter, the appropriate horizontal and vertical magnets in the crossbar switches are operated to connect the "B" appearance of the intra-unit trunk to the called line and the "A" appearance of the intra-unit trunk 216 to the calling line 210 over line link frames 212 and 213 and trunk link frame 215. The marker releases the originating register 514, establishes the connection and energizes ringing selection switch 317 to supply the appropriate ringing to the called line 211. The marker then releases.

Intra-unit trunk 216 now governs the ringing and supervision of the call in a manner similar to that performed by a conventional intraoffice trunk for an intraoffice call as described, for example, in the Busch patent.

When the conversation is completed and substations 210 and 211 are returned to the on-hook condition, the intra-unit trunk functions to release the connection in the conventional manner, although without control directions from the office.

The relationship of the lines which are directly connected to the office in the conventional manner to the remotely connected lines is shown by substation 455. This substation is terminated at conventional line link frame 453. A group of local junctors, of which junctor 454 is illustrative, is connected directly between line link frame 453 and trunk link frame 512.

DETAILED DESCRIPTION OF MAJOR COMPONENTS

FIG. 2 shows two substations 210 and 211 which are illustrative of a substantially larger number of substations, not shown. Substations 210 and 211 are connected over conventional loop circuitry to the vertical conductive paths of line link frames 212 and 213, respectively. Trunk link frame 215 is shown as connectable to the line link frames 212 and 213 in a conventional manner described in the above-referred-to Busch patent and modified to connect some line link frame junctors to the extended junctors. Intra-unit trunk 216, which is exemplary of a number of intra-unit trunks, is adapted to provide a connection between the tip, ring, and sleeve conductors (T, R, and S) of various trunk circuits to effect a speech connection therebetween in the manner described in the Busch patent for an intraoffice trunk circuit. The control circuitry in the trunk circuit is shown symbolically by contacts 235 which may be operated to interconnect the "A" and "B" appearances. Connectors 217 and 218 and their counterpart connectors 432 and 433 in the central office afford control access to the line link frames and the trunk link frame, respectively, in the conventional manner and may illustratively include multicontact relays to open or close the numerous control connections extending to the line link and trunk link frames.

In view of the remote disposition of the equipment shown in FIGS. 2 and 3, the connectors 217 and 218 are not directly connectable to the marker circuitry in the central office as in the conventional manner but instead must transmit and receive information through the data control system which includes the remote data transmitter 219, data receiver 410, transmitter 411, and receiver 220.

Scanner 221 at the remote unit, shown symbolically as a stepping switch, periodically samples each of the conventional control conductors extending to the line link and trunk link frames for supervisory conditions thereon. In each instance the information appearing on the control conductors is extended over conductor 222 to the remote data transmitter 219 which in turn, over channel 223, transmits the information to the data receiver 410 at the central office. The latter device is capable (illustratively) of receiving information at relatively high rates of speed. Buffer circuitry in the form of lead memory 412 is therefore included at the output of the data receiver 410 to store the signals received at a relatively high rate and to operate conventional electromechanical contacts to reflect this information.

Extending from the lead memory 412 is a full set of control conductors identically corresponding to those being scanned by scanner 221 at the remote unit. The lead memory 412 applies a condition to each of these conductors identical to the condition existing on the corresponding conductor at the remote unit. As a result the distance between the remote unit and the central office is "bridged" by the data transmission system and the lead memory. In consequence, the conductors, extending to the marker 415 through connector 432 for the line link frame and connector 433 for the trunk link frame and other common control equipment in the central office, experience control indications thereon which would be identical to those that would have been received if the equipment were, in fact, directly connected to the marker 415 at the central office.

It follows that the same problem with respect to transmission of information between the remote unit and the central office exists for control or supervisory indications emanating from the common control equipment at the central office and directed to the remote frame equipment. For this purpose scanner 413, data transmitter 411, receiver 220, and lead memory 224 serve an identical purpose to that discussed for the data transmission in the direction from the remote unit to the central office. Thus, scanner 413, shown symbolically as a stepping switch, examines all of the appropriate conductors extending from the common circuitry and delivers indications of the supervisory condition thereon, e.g., ground or negative battery to data transmitter 411 which forwards this information to data receiver 220 and lead memory 224. It will be noted that the buffer circuitry in lead memory 224 may illustratively include ferreeds of the type described in an article entitled The Ferreed—A New Switching Device, vol. 39, Bell System Technical Journal, January 1960, page 1.

The marker circuitry of FIG. 4 includes the appropriate class of service and routing relays for determining the identity of an intraremote unit call as will be explained in detail herein.

It is seen from the above that FIGS. 2 and 4 show in large measure the control connections between the remote unit and the central office as adverted to above. The speech connections or conversation paths between the remote unit and the central office are included in FIGS. 3 and 5 which show appropriate central office extended junctor circuitry 510 and remote unit extended junctor circuitry 310.

As will be seen from the discussion herein, these extended junctor circuits are designed to stretch or extend the conventional junctor circuits which ordinarily appear between the line link frame and the trunk link frame. For example, junctor 226 from line link frame 212 extends to the T1, R1, and S1 conductors of extended junctor circuit 310 through repeater amplifier 311, conductors 312 and 313 to repeater 511 in extended junctor circuit 510 at the central office. The tip, ring, and sleeve conductors T1, R1, and S1 of extended junctor circuit 510 extend to conventional trunk link frame 512 when in turn is connectable to originating registers, intraoffice trunks, incoming trunks and outgoing trunks in the usual manner.

Viewed overall, the function of extended junctor circuitry 310 and 510 is to bridge the distance between the remote unit and the central office with respect to speech transmission, dial pulsing, etc., in a manner which simulates to trunk link frame 512 that line link frame 212 is directly connected thereto. In short, the extended junctor circuitry is designed to connect to trunk link frame 512 in a manner such that the latter is unaware that line link frame 212 is not physically located in the same office as in the conventional arrangement.

A similar path may be traced for the extended junctor circuitry available to line link frame 213 over conductor 225, junctor circuit 314, conductors 315 and 316, and central office junctor circuit 513 to trunk link frame 512. It is seen that the extended junctor circuitry performs a function with regard to the speech or conversation paths that the data transmission system performs with respect to the majority of control communications, i.e., bridging the gap between the remote unit and the central office.

The path for communications between the remote substations and central office may be contrasted with that for substation 455 which is shown as directly connected to line link frame 453 in the conventional manner. Access is then available to trunk link frame 512 over a group of junctors 454 under control of the marker as explained in detail in the above-referred-to Busch patent.

DETAILED DESCRIPTION OF OPERATION

*Dialing connection*

It will be assumed for purposes of illustration that a subscriber at substation 210 is seeking to effect a connection to a subscriber connected to the same remote unit at substation 211. When substation 210 goes off hook, a line relay in the line link frame, not shown, is operated which causes the line link frame to energize conductor 227. Scanner 221, in its periodic examination of the terminal to which conductor 227 is connected, transmits an indication representative of the energized condition of conductor 227 over transmitter 219, channel 223, receiver 410 and conductor 414 to energize an appropriate group of contacts in the lead memory which extend a corresponding energized condition to a conductor coupled to a connector. The latter is conventional equipment shown symbolically by connectors 432 and 433 and described in detail in the above-referred-to Busch patent. In a conventional manner a marker is selected, for example marker 415. At this time numerous other conductors similar to conductor 227 in the line link frame are energized through connector 217 to transmit to the marker the identity of the calling line.

The marker then proceeds to extend a connection from the calling substation to an idle originating register, for example register 514, by determining its availability through connector 551. In doing so the marker determines the class of service from the vertical file on which the calling line appears in the conventional manner and also determines the equipment location of the calling line on the line link frame in the conventional manner. All of this information is transmitted in due course over channel 223 and the lead memory 412 to energize the appropriate conductors extending to the marker circuit. This is shown symbolically by the operation of contacts 431 in lead memory 412.

The marker then proceeds to select an idle channel between the subscriber line and originating register 514. It will be assumed that this channel includes conductor 226, extended junctor circuit 310, conductors 312 and 313, and extended junctor circuit 510 to conductors T1, R1, and S1 extending to trunk link frame 512 and originating register 514. Having established the availability of a channel, the marker operates the necessary select (horizontal) and hold (vertical) magnets required to close through the channel by delivering the appropriate information over channel 230, data receiver 220, lead memory 224, connector 217, and conductor 233.

At this time the subscriber is connected to the originating register 514 over the path traced above. The register furnishes dial tone and is prepared to receive the dialed digits.

Since it has been assumed that station 211 is to be called, the originating register 514 will receive and store the digits corresponding to the directory number of called station 211. After register 514 receives the necessary information, it engages a marker circuit in the conventional manner via originating register marker connector 552 and transmits the appropriate information to the marker. The operation of the extended junctor circuitry including the transmission of dialing information is examined in detail in the following section.

*Operation of extended junctor circuitry*

Dial pulse information is transmitted over the extended junctor through the operation of relays 3A and 5A1. Thus, the operation of relay 3A at the remote unit, in view of the closure of the loop circuit by the dial pulsing contacts at substation 210, results in the operation of relay 5A1 over a path which may be traced from positive 130 volts, contacts of relay 3A, resistance 318, winding 320, repeater 311, conductor 313, repeater amplifier 511, winding 516, winding of relay 5TG1, and winding of relay 5A1 to negative battery. Operation of relay 5A1 results in a closure of the loop circuit including conductors T1 and R1 at the central office over a path including conductor R1, winding 517, contacts of relay 5A1, winding 522, and conductor T1 to trunk link frame 512 and originating register 514.

The extended junctor circuitry is also equipped to perform other routine functions essential to the operation of the remote equipment. Thus, repeating of tip party ground is essential in establishing party identification. The remote unit relay 3TG is equipped with a double winding which is wound in opposition and prevents the relay from operating unless the usual identifying resistance appears on the tip side of the subscriber loop circuit. Operation of relay 3TG results in the shunting of resistance 318 thereby providing sufficient current flow in channel 313 to operate marginal relay 5TG1. In turn the operation of relay 5TG1 places a ground on the tip conductor T1 extending to trunk link frame 512 thereby simulating the tip party ground. As indicated above, ringing is established at the remote unit through local equipment. However, ringing is also conducted at the central office end of the extended junctor circuit in order that a ringing start signal and audible ringing may be generated.

An additional essential supervisory condition which must be transmitted from the remote unit to the central office and vice versa is the supervisory condition on the sleeve circuit. It has been found desirable in this embodiment of my invention to transmit this information over the data transmission system.

Relay 5S1 at the central office and relay 3S3 at the remote unit include differentially wound windings. Thus, the application of a ground potential to terminal S1 at the central office results in the operation of relay 5S1 in view of the unbalancing of the differentially wound coils. The contacts of relay 5S1 extending to the scanner circuit over conductor 519 are closed. In its periodic examination of the terminal connected to conductor 519, the scanner 413 will detect the ground condition and transmit information representative thereof over the data transmission circuit including channel 230 to lead memory 224 which, as indicated above, will operate the equipment internal thereto, shown symbolically by the closure of contacts 228, to operate relay 3S4 at the remote unit. Operation of relay 3S4 places a ground condition on one of the differentially wound windings of relay 3S3 but does not operate relay 3S3 since substantially equal current flows through both windings and a balance condition exists. This results in the application of a ground condition to conductor S1 extending to the line link frame. Thus, the supervisory condition on the sleeve at the central office has been transmitted to the remote unit. A similar analysis may be made to indicate that the opposite direction of operation, that is, transmitting a sleeve indication from the remote unit to the central office unit, proceeds in an identical manner. Thus a ground on sleeve S1 at the remote unit results in the operation of relay 3S3 which in turn closes the contacts of relay 3S3 extending to the scanner circuit over conductor 319. This information is transmitted to the central office over the data transmission system and ultimately appropriate contacts in the lead memory, shown symbolically as contacts 423, are operated and extend a ground condition over conductor 424 to operate relay 5S2. Operation of the latter relay results in the application of substantially a ground potential to conductor S1 over the lower winding of relay 5S1 although relay 5S1 does not operate.

The parameters of relay 3S3 may illustratively take the following values (for sleeve battery applied from a 1570Ω or 785Ω source):

| | |
|---|---|
| Upper winding impedance | 1,000Ω |
| Lower winding impedance | 110Ω |
| Turns ratio (upper to lower) | 2000/1000 |

The parameters of relay 5S1 may illustratively take the following values (for sleeve battery applied from a 1570Ω or 695Ω source);

| | |
|---|---|
| Upper winding impedance | 5,000Ω |
| Lower winding impedance | 29Ω |
| Turns ratio (upper to lower) | 5000/800 |

For a detailed analysis of the interrelationship of relays 5S1 and 3S3 reference may be made to application of J. Z. Jacoby, Serial No. 162,167, filed on even date herewith.

A number of other significant control functions are also incorporated in the extended junctor circuit to bridge the gap occasioned by the distant location of the remote switching units. This includes, for example, the problem of providing a repetition of ringing in setting up a delayed toll call. In this instance an operator having set up a connection to the calling substation and also a connection to the called substation seeks to initiate ringing to the calling substation.

Ringing start and ringback are repeated in the extended junctor circuit by the operation of ringing detection relay 5R at the central office which operates in series between conductors T1 and R1 over the appropriate diodes for each ringing cycle. Thus, when the ring conductor R1 is more positive than the tip conductor T1, a path may be traced from conductor R1, contacts of relay 5A1, diode 531, winding of relay 5R, diode 534, capacitor 535 to tip conductor T1 to energize relay 5R. Operation of relay 5R at the central office extended junctor circuit results in the shunting of resistance 536 by the contacts of relay 5R. As a result a circuit may be traced from positive battery, contacts of relay 5R, contacts of relay 5S1, winding 537, repeater 511, channel 312, repeater 311, winding 331, winding of relay 3R1 to negative battery. Operation of relay 3R1 causes the operation of the ringing control relay 3RC, if the ringing start relay 3RS has been operated, over a path from ground, contacts of relay 3R1, contacts of relay 3RS, contacts of relay 3TR, winding of relay 3RC to negative battery.

The ringing start relay 3RS is energized over the data transmission system as shown symbolically by the operation of contacts 231 and the energization of conductor 232. The initiation of this action at the central office may proceed in various ways including the extension of contacts of relay 5R to a terminal on scanner 413.

Trip relay 3TR is energized in the conventional manner over the tip and ring conductors when the substation goes off hook to answer the call.

Operation of relay 3TR results in the release of the ringing switch, also in the conventional manner and releases the ringing control relay 3RC and ring start relay 3RS.

It is manifest that in an intra-unit call repetition of ringing in this manner is not required and that the intra-unit trunk may autonomously control ringing in a conventional manner as an intraoffice trunk would on an intraoffice call.

*Establishing intra-unit connection*

Returning to the completion of the call, after the marker receives the appropriate information from the originating register 514, it proceeds to effectuate a connection between the calling and called substations.

The initial procedure by the marker is to translate the office code to determine the destination of the call. Equipment in the marker circuitry, a portion of which is shown in FIG. 4, examines the first three or office code digits to determine the routing of the call and places a marking potential on a particular code point in an array of code points shown symbolically by code points 417 and 418. Since it has been assumed that calling substation 210 and called substation 211 are connected to the same remote unit, an intra-unit call is in effect. As a result, equipment in the marker, shown symbolically by contacts 419, places a reference potential on code point 418. Prior thereto, class-of-service relay 4S1 has been operated conventionally by information transmitted from the remote unit over the data transmission system to lead memory 412. Appropriate memory equipment in lead memory 412, shown symbolically by contacts 420, results in the operation of relay 4S1 as representative of the class of service of the called substation. As a result, a path may be traced over the contacts 434 of relay 4S1 up to the contacts of relay 4RSU0. Also prior thereto, relay 4RSU0 which indicates the particular remote unit to which the calling substation is connection has been operated from information transmitted from the remote unit. Illustratively this is shown by the operation of contacts 421 to energize relay 4RSU0. Thus, relay 4RSU0 is common to each of the link frames for a particular remote switching unit, in this case remote switching unit 0.

At this time an additional path may be traced from ground, contacts 419, code point 418, over the contacts of relay 4RSU0 to number group 416. Seizure of the number group affords an identification of the equipment location of the called line in the conventional manner described in the above-referred-to patent to Busch. Since it has been assumed that an intraremote unit call is in effect, energization of the number group circuit 416 results in the operation of relay 4CRSU0 which represents that the called line link frame is in remote switching unit 0. This operation is shown symbolically by switch 422. Thereafter, a further circuit may be traced from code point 418, contacts 434 of class-of-service relay 4S1, contacts of relays 4RSU0, 4CRSU0, to relay 4RT0 to energize that relay. Relay 4RT0 is representative of the routing relay in the marker circuit which selects the particular channel to be employed in completing the connection. Under the given conditions the marker proceeds to establish an intra-unit trunk connection governed by route relay 4RT0 by selecting an intra-unit trunk of which trunk 216 is representative and connecting first the "B" appearance of the intra-unit trunk to the called line and then the "A" appearance of the intra-unit trunk to the calling line by closing the appropriate horizontal and vertical magnets over the data transmission circuit, releasing the calling line from its originating register connection in the conventional manner.

After the originating connection has been set up between the calling line link frame 212 and the "A" appearance of the intra-unit trunk on the trunk link frame 215, the marker releases from the intra-unit connection after setting the ringing selection switch 317 to supply the appropriate ringing to the called line.

The intra-unit trunk now controls the ringing and supervision of the call in a manner similar to that performed by an intraoffice trunk for an intraoffice call. The conventional control equipment in the intra-unit trunk for performing these and other functions is shown symbolically by contacts 235. Ringing is "tripped" when the called party answers and the ringing selection switch 317 is released conventionally.

When the conversation is completed and substations 210 and 211 are returned to the on-hook condition, the intra-unit trunk functions in a manner similar to a central office intraoffice trunk, as explained in detail in the Busch patent, in releasing the calling and called connections but, in this case, autonomously, and at a substantial distance from the office.

*Call from remote unit RSU0 to remote unit RSU1*

In the event that a connection is to be completed between two distinct remote units, an intra-unit trunk cannot be used to complete the call and instead the connection must be forwarded over separate extended junctor circuits leading from the central office to both remote switching units.

Examining the routing circuitry in FIG. 4 for a call between remote unit RSU0 and RSU1, it will be seen that relay 4RSU0 will operate to indicate that the calling line link frame is in remote switching unit RSU0 in the manner indicated above. However, in examining the called line equipment location in the number group circuit, the marker will determine that the called line link frame is in remote switching unit 1 and as a result causes the energization of relay 4CRSU1 as shown symbolically by the operation of switch 423. Thus, a path may be traced from ground, switch 419 operated in the manner indicated above, code point 418, contacts 434 of relay 4S1 also operated in the manner indicated above, contacts of relay 4RSU0, relay 4CRSU1 to the intraoffice route relay. Having established this information, the marker proceeds to effectuate an intraoffice trunk connection utilizing trunk line frame 512, intraoffice trunk 520 and separate extended junctor circuits to remote switching unit 0 and remote switching unit 1 of which only the former is shown in FIG. 2.

A similar pattern would exist if a call was initiated from a remote unit to a line connected directly to the main central office, for example line 455. Under these conditions relay 4CNR would be operated as a result of the number group determination as indicative of a called line which is not remote but instead is connected directly to the central office. Investigation of the routing circuitry will show that if the call had originated at remote switching unit 0 for a line in the central office, a path may be traced over switch 419, code point 418, contacts 434, contacts of relay 4RSU0, contacts of relay 4CNR to the intraoffice route relay which would initiate the intraoffice trunk connection adverted to above.

A similar situation would exist if a call were undertaken from a line connected directly to the central office, for example line 455, to a line connected to the remote unit RSU0. Under these conditions relay 4NRSU would be operated to indicate that the calling line link frame is located in the central office as shown symbolically by the operation of switch 425. A path may be traced in this instance from ground, switch 419, code point 418, contacts 434, and contacts of relay 4NRSU, to the intraoffice route relay to initiate an intraoffice trunk connection.

In the event that a call is intended to extend from a remote switching unit to a different office, this situation is shown in FIG. 4 symbolically by the operation of switch 426 to apply a ground condition to code point 417 and over the contacts 427 of class-of-service relay 4S1 to operate the appropriate interoffice route relay to initiate the connection to a distant office in the conventional manner detailed in the above-referred-to patent of A. J. Busch.

It is understood that the above embodiments are merely illustrative and that various modifications may be made without departing from the spirit and scope of the invention.

What is claimed is:

1. A distributed telephone switching system including a crossbar telephone central office, a plurality of substation lines remote from said office, a plurality of remote switching units for connecting said lines to said office, said remote switching units including a plurality of line link frames and a trunk link frame, an intra-unit trunk at said remote switching unit, means at said central office responsive to an originating call at one of said substations connected to a particular remote switching unit directed to another substation connected to the same remote unit for governing said remote switching unit to extend a channel through said line link frame, trunk link frame and intra-unit trunk to connect said calling and called lines, and means at said remote unit for supervising said call independent of any channels to said office.

2. A distributed telephone switching system including a telephone crossbar central office, a local trunk link frame in said office, a plurality of remote substation lines, a plurality of remote switching units for terminating said lines, said units including line link frames and trunk link frames, remote junctor circuits coupling said remote line link and trunk link frames, extended junctor circuits coupling said remote line link frames to said local trunk link frames, signaling means for transferring control information between said central office and said remote units, and means in said office responsive to an originating call at one of said substations connected to a particular remote unit for extending a connection to another substation connected to the same unit through said remote trunk link frame, remote line link frames and remote junctor circuits in response to signals over said signaling means and extended junctor circuits.

3. An automatic telephone switching system including a crossbar telephone central office, a plurality of substation lines remote from said office, a plurality of remote switching units, said units including remote line link frames on which said substations are terminated, remote trunk link frames in said units, a local trunk link frame in said central office, extended junctor circuits coupling said remote line link frames to said local trunk link frame, remote junctor circuits for connecting said remote line link frames to said remote trunk link frames, signaling means for transmitting control information between said central office and said remote units, means in said central office responsive to a calling condition at a first substation for extending a connection to said first substation over a path including said remote line link frame, extended junctor circuit and local trunk link frame, means in said office responsive to signals from said first substation representative of a second substation terminated on the same remote switching unit for energizing said remote trunk link frame to extend a connection between said first and said second substations under control of said signaling means, and means in said remote unit for supervising said connection independent of any channel to said office.

4. An automatic telephone crossbar switching system including a telephone central office, a plurality of remote substation lines, a plurality of remote switching units for interconnecting said lines under control of said central office, a remote trunk link frame in said units, signaling means for transmitting control information between said central office and said remote units, marker means in said central office, and routing means in said marker means responsive to an originating call at a first substation directed to a second substation connected to the same remote unit for extending a connection between said first and second substations over said remote trunk link frame under control of said signaling means.

5. An automatic distributed telephone switching system including a crossbar telephone central office, a plurality of remote substations, a plurality of remote switching units at which said substations are terminated, a plurality of extended junctor circuits for connecting said remote switching units to said office, signaling means for transmitting control information between said central office and said remote units to govern the connection of said substations to said office and to govern the remote interconnection of said substations, marker means in said central office including routing means, means including said marker means responsive to an originating call at a first substation for extending a dial pulse signaling path from said substation to said central office, and means in said office responsive to the reception of dialed information representative of a substation connected to a distant office for operating said routing means in said marker means to indicate the initiation of an interoffice call.

6. An automatic distributed telephone switching system including a crossbar telephone central office, a plurality of remote substation lines, a plurality of remote switching units for connecting said lines to said office, said remote switching units including a plurality of line link frames and a trunk link frame, an intra-unit trunk at said remote switching units, marker means in said central office, means including said marker means responsive to an originating call at a first substation directed to a second substation connected to the same remote unit for extending a connection between said first and second substations over said trunk link frame and intra-unit trunk, said marker means comprising routing means including an intra-unit route relay operative to identify the origination of an intra-unit call.

7. An automatic telephone switching system including a telephone crossbar central office, a plurality of remote substation lines, a plurality of remote switching units for terminating said lines, control means at said central office responsive to an originating call at one of said substations connected to a first remote switching unit directed to another of said substations connected to a second remote switching unit for governing said remote switching units to extend a speech channel between said first and second substations through said central office, said control means including marker means, and routing means including an interunit routing relay in said marker means operative to indicate the establishment of said interunit call.

8. An automatic telephone switching system including a crossbar telephone central office, a plurality of remote substation lines, a plurality of remote switching units for terminating said lines, a plurality of extended junctor circuits for coupling said remote switching units to said office, signaling means for transmitting control information between said office and said remote units, marker means in said central office responsive to the initiation of an intra-unit call between two substations connected to the same remote switching unit for interconnecting said substations in said remote switching unit independent of said extended junctor circuits, said marker means including routing means comprising a first group of relays indicative of the routing pattern to be selected, a second group of relays indicative of the identity of remote switching units having calling lines thereat, a third group of relays indicative of remote switching units having called lines thereat, and means responsive to the operation of relays in said second and third groups indicative of the same remote switching unit for operating a relay in said first group representative of an intra-unit routing pattern.

9. An automatic telephone switching system including a crossbar telephone central office, a plurality of remote substation lines, a plurality of remote switching units for interconnecting said lines under control of said office, a plurality of extended junctor circuits for connecting said remote switching units to said office, marker means in said central office responsive to an originating call at one of said substation lines connected to a first remote switching unit directed to another of said substation lines connected to a second remote switching unit for governing the interconnection of said substations, said marker means including routing means comprising a first group of relays representative of selected routing patterns, a second group of relays representative of the identity of remote switching units having calling lines thereon, a third group of relays representative of remote switching units having called lines thereon, and means responsive to the operation of a relay in said second group and a relay in said third group representative of different remote switching units for operating a relay in said first group representative of an interunit routing pattern.

10. A telephone switching system including a crossbar telephone central office, a local trunk link frame in said office, a plurality of remote substations, a plurality of remote switching units for connecting said substations to said office, said remote switching units including line link frames on which said substations are terminated and remote trunk link frames, extended junctor circuits coupling said remote line link frames to said local trunk link frame, signaling means for transmitting control information between said central office and said remote units, marker means in said central office for governing the establishment of connections between said substations, said marker means including a first group of relays representative of selected routing patterns, a second group of relays representative of the identity of remote switching units having calling lines thereon, a third group of relays representative of the identity of remote switching units having called lines thereon, a fourth group of relays representative of the class of service of calling substations, and means responsive to the operation of selected combinations of relays in said second, third, and fourth groups to operate selected relays in said first group indicative of the routing pattern selected for a particular connection preparatory to extending connections between said line link frames and trunk link frames.

11. A distributed telephone switching system including a crossbar telephone central office, a plurality of remote substation lines, a plurality of remote switching units for connecting said lines to said office, said remote switching units including a plurality of line link frames and a trunk link frame, an intra-unit trunk at said remote switching unit, marker means in said central office for governing the interconnection of said substations, routing means in said marker means comprising a first group of relays representative of a selected routing pattern, a second group of relays representative of the identity of remote switching units having calling lines thereon, a third group of relays representative of the identity of remote switching units having called lines thereon, signaling means for transmitting control information between said central office and said remote switching units, and additional means in said routing means effective upon the operation of a relay in said second group and a relay in said third group representative of the same remote switching unit for actuating said signaling means to energize said intra-unit trunk to interconnect said calling and called substations over said line link frames and trunk link frame.

12. A distributed telephone switching system including a crossbar telephone central office, a plurality of remote substation lines, a plurality of remote switching units for terminating said lines, said remote switching units including a plurality of line link frames and a trunk link frame, an intra-unit trunk at said remote switching unit, a plurality of junctor circuits for coupling said remote switching units to said office, signaling means for transmitting control information between said central office and said remote switching units, means responsive to an originating call at one of said substations for extending a connection from said substation to said office over a selected one of said junctor circuits, control means at said office responsive to the reception of dialed information representative of a called substation connected to the same remote switching unit for releasing said junctor circuit and for interconnecting said substations through said intra-unit trunk over said line link frames and trunk link frame, said control means including a first group of relays indicative of a routing pattern to be selected, a second group of relays representative of the identity of remote switching units having calling substations thereon, a third group of relays representative of remote switching units having called substations thereon, and means responsive to the operation of relays in said second and third groups representative of the same remote switching unit for energizing a relay in said first group representative of an intra-unit routing pattern.

13. A distributed telephone switching system including a telephone central office, a plurality of substations remote from said office, a plurality of remote switching units for coupling said lines to said office and to each other, a first group of channels for transmitting speech and control signals between said remote units and said office, a second group of channels for transmitting only control signals between said remote switching units and said office, means responsive to an originating call at a calling one of said substations directed to a called one of said substations connected to the same remote switching unit for initially extending a connection to said office over a selected one of said first group of channels and for thereafter releasing said selected channel in response to information transmitted over a selected channel in said second group of channels, and means at said remote switching unit for extending and supervising a connection between said calling and called substations independent of all of said channels.

14. A distributed telephone switching system including a telephone central office, a local trunk link frame in said office, a local line link frame in said office, a first and second group of substations, a plurality of remote switching units for connecting said first group of substations to said office, said remote switching units including remote line link frames on which said substations are terminated, extended junctor circuits coupling said remote line link frames to said local trunk link frame, local junctor circuits connecting said local line link frame to said local trunk link frame, means for connecting said second group of substations to said local line link frame, means in said office responsive to an originating call at one of said substations in said first group for extending a channel to said one substation over a path including said remote line link frame, extended junctor circuit and local trunk link frame, and additional means in said office responsive to an originating call at one of said substations in said second group for extending a channel to said substation over a path including said local line link frame, local junctor circuit and local trunk link frame.

15. An automatic distributed telephone switching system including a telephone central office, a first and second group of substations, a local trunk link frame in said office, a local line link frame in said office, local junctor circuits coupling said local line link and trunk link frames, a plurality of remote switching units for extending a connection to said first group of lines under control of said office, a remote trunk link frame in said remote unit, a remote line link frame in said remote unit connectable to said remote trunk link frame for intra-unit calls, a plurality of extended junctor circuits for coupling said remote unit to said office, a plurality of remote junctor circuits for coupling said remote line link frame to said remote trunk link frame, and means in said office responsive to an originating call at one of said substations in said first group directed to a substation in said second group for extending a channel between said substations including said remote line link frame, extended junctor circuit, local trunk link frame, local junctor circuit and local line link frame.

References Cited by the Examiner

UNITED STATES PATENTS

| | | | |
|---|---|---|---|
| 2,885,481 | 5/59 | Lomax | 174—18 |
| 2,932,695 | 4/60 | Gohorel | 179—18 |
| 2,933,564 | 4/60 | Pearce et al. | 179—18 |
| 3,022,382 | 2/62 | Ewin | 179—18 |

ROBERT H. ROSE, *Primary Examiner.*

WALTER L. LYNDE, *Examiner.*